July 29, 1969 KATSURO NAKAMURA 3,458,724

DIGIT DRIVER SYSTEM FOR A HIGH-SPEED MAGNETIC MEMORY DEVICE

Filed Nov. 17, 1965 3 Sheets-Sheet 1

INVENTOR.
KATSURO NAKAMURA
BY
H. Edward Nestern

INVENTOR.
KATSURO NAKAMURA
BY
H. Edward Mestern

INVENTOR.
KATSURO NAKAMURA
BY
H. Edward Mostern

United States Patent Office 3,458,724
Patented July 29, 1969

3,458,724
DIGIT DRIVER SYSTEM FOR A HIGH-SPEED MAGNETIC MEMORY DEVICE

Katsuro Nakamura, Tokyo-to, Japan, assignor to Toko Kabushiki Kaisha, Tokyo-to, Japan, a joint-stock company of Japan Filed Nov. 17, 1965, Ser. No. 508,283
Claims priority, application Japan, Nov. 20, 1964, 39/65,485
Int. Cl. H03k *3/26, 17/56*
U.S. Cl. 307—242 3 Claims

ABSTRACT OF THE DISCLOSURE

A digit driver system for a high speed magnetic memory device has at least one contactless electronic switch with a terminal for receiving writing information from the memory register and at least one pulse driver to amplify the writing instruction pulses and to feed it to the electronic switch thereby to obtain a writing current with a polarity that corresponds to the writing information that enters the control terminal of the electronic switch.

Figure 1A:
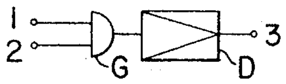

This invention relates to digit drivers for magnetic memory devices and more particularly to a new digit driver entailing negligible time delay and thereby affording high-speed operation of magnetic memory devices.

It is a principal object of the present invention to reduce the time delay required for amplifying writing-in current in a magnetic memory device thereby to increase the operational speed of magnetic memory devices.

A magnetic memory device, as is known, comprises memory elements for storing information, auxiliary circuits such as various kinds of drivers (driving amplifiers) for accomplishing reading and writing, a sense amplifier for amplifying read-out signals, and a memory register, and a control circuit for sending instruction pulses to the auxiliary circuits and, moreover, for governing timing. Of these circuits, the digit driver is an amplifier which discriminates the nature, whether "1" or "0," of information in stored state in the memory register when a writing-in instruction pulse is sent with appropriate timing from the control circuit and, after amplifying this information into a writing-in current (pulse) of a waveform necessary for writing in of the information, sends out the writing-in current to a digit line.

For different characteristics and principle of writing, the amplitude and polarity of the writing-in current necessary for writing information, of course, also differ, and the digit driver system also assumes correspondingly different forms.

Known digit drivers have been accompanied by a certain time delay which obstructs development of high-speed memory devices as will be more fully described hereinafter.

Briefly stated, the present invention, which contemplates reducing this time delay, resides in a digit driver for magnetic memory devices which comprises at least one electronic switch having a control terminal for receiving writing information from the memory register and at least one pulse driver for amplifying, beforehand, writing instruction pulses to an amplitude and waveform necessary for writing, the output side of the pulse driver being connected to the input side of the electronic switch thereby to obtain from the output side of the electronic switch a writing current with a polarity corresponding to said writing information entering the control terminal of the electronic switch.

Figure 2A:
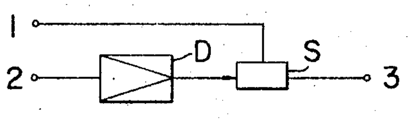
Figure 1B:
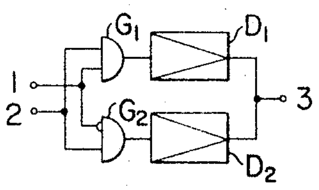
Figure 2B:
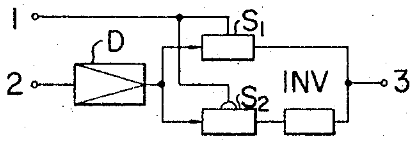
Figure 1C:
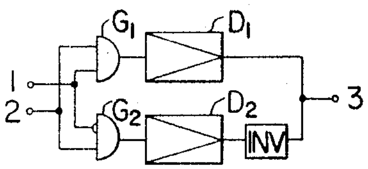
Figure 2C:
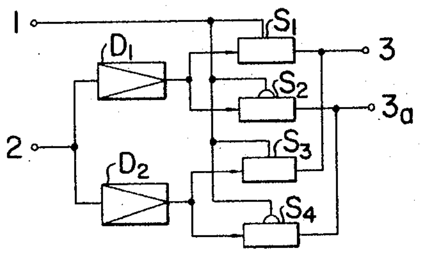

The nature, principle, and details of the present invention will be more clearly apparent from the following detailed description taken in conjunction with the accompanying drawings in which like parts are designated by like reference numerals and characters, and in which:

FIGS. 1(A), 1(B), and 1(C) are schematic diagrams respectively showing digit drivers of known composition and arrangement;

FIGS. 2(A), 2(B), and 2(C) are similar schematic diagrams showing examples of composition and arrangement of the digit driver embodying the invention;

FIGS. 3 through 6, inclusive, are pulse charts indicating the input and output timings in known digit drivers and in the digit driver of the invention and corresponding respectively to the digit drivers shown in FIGS. 1(A), 2(A), 1(B) and 1(C), and 2(B);

FIGS. 7 through 10, inclusive are circuit diagrams showing actual examples of compositions and arrangements of the digit driver according to the invention.

As conducive to a full understanding and appreciation of the nature and utility of the present invention, the following brief consideration of known digit drivers is believed to be useful.

Referring to FIG. 1(A), there is shown therein a digit driver for use in a magnetic core memory device of coincident-current type in which a ferrite core is used. This digit driver comprises a gate G and a single-polarity pulse driver D produces a current pulse of a specific polarity and wave form as its output only when a digit "1" (or "0") is to be written. The input side of the gate G is provided with an input terminal 1 for introducing information from a memory register and an input terminal 2 for introducing writing instruction pulses, and the output of the pulse driver D is provided with an output terminal 3 for sending out writing current.

The digit drivers shown in FIGS. 1(B) and 1(C) are for the case of use by the word selection method of memory elements in which ferromagnetic thin films are used and produce, as output, writing current pulses of mutually opposite polarity for writing digits "1" and "0." The digit driven shown in FIG. 1(B) comprises a positive pulse driver $D_1$, a negative pulse driver $D_2$, and first and second gates $G_1$ and $G_2$. The digit driver shown in FIG. 1(C) comprises two positive pulse drivers $D_1$ and $D_2$, a polarity inversion device INV as, for example, a pulse transformer, and first and second gates $G_1$ and $G_2$.

A common characteristic of the known digit drivers described above is that at least one AND gate is used as means for discriminating information stored in a memory register when a writing instruction pulse is sent from a control circuit. For this reason, a writing instruction pulse cannot be sent unless the memory register is set. Furthermore, in order to amplify the output of the AND gate to a current value necessary for writing, a time delay T for amplification is inevitably entailed as indicated in FIGS. 3 and 5.

Figure 3:
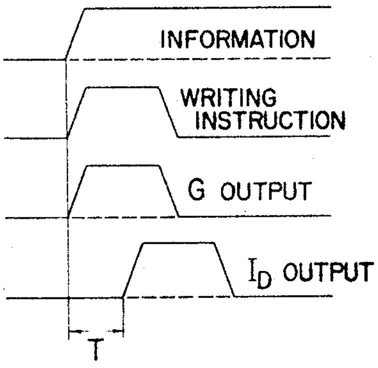
Figure 4:
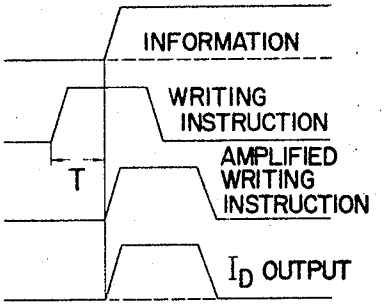
Figure 5:
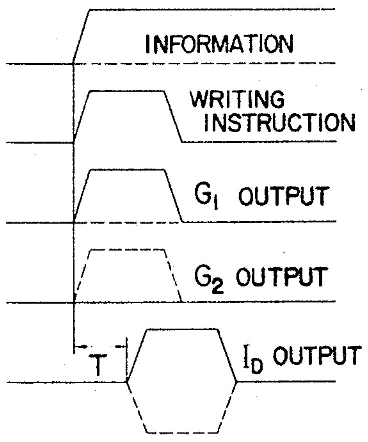

In FIGS. 3 and 5, which respectively indicate the pulse timings in the cases shown in FIG. 1(A) and FIGS. 1(B) and 1(C), the full lines represent the writing of digit "1," and the dotted lines represent the writing of digit "0." In FIGS. 3 through 6, the reference term "INFORMATION" designates an electrical signal from a memory register introduced into the terminal 1 of either FIG. 1 or FIG. 2.

The above mentioned delay causes a time delay of at least T from the instant at which the memory register is set by the information to be written to the instant at which the writing current begins to flow, which time delay is a principal factor obstructing increased operational speeds of memory devices of the instant type.

The present invention contemplates reduction of this time delay to a negligible magnitude by the digit driver described hereinafter with respect to preferred embodiments of the invention.

Referring to FIG. 2 illustrating examples of digit drivers according to the invention, FIG. 2(A) indicates the case where a single-polarity writing current is obtained, FIG. 2(B) indicates the case where an ambipolarity writing current is obtained, and FIG. 2(C) indicates the case where an ambipolarity writing current with two symmetrical outputs is obtained. Throughout FIG. 2, reference characters S, $S_1$, $S_2$, etc. designate electronic switches, D designates a pulse driver, $D_1$ and $D_2$ in FIG. 2(C) respectively designate positive and negative pulse drivers, reference numerals 1, 2, and 3 designate terminals as in FIG. 1, and 3*a* is a second output terminal.

The term "electronic switch" herein refers to a switch which has input, output, and control terminals, and in which components such as vacuum tubes, transistors or other semiconductor devices are used.

A feature of each of the examples of the invention shown in FIG. 2, is that a writing instruction pulse is first amplified beforehand to an amplitude necessary for writing and then led to an electronic switch to cause the electronic switch to be controlled by the content of the memory register, whereby there is produced a writing current with a polarity corresponding to an information stored in the memory register.

Figure 6:
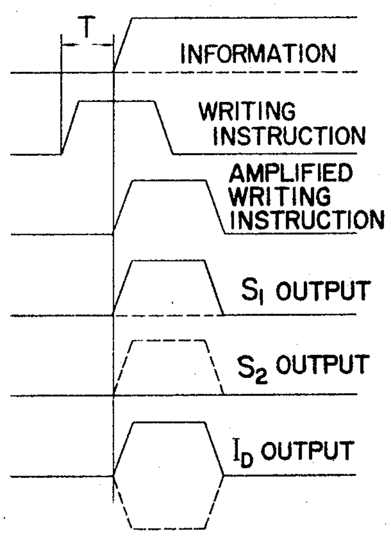

Since the electric power for controlling this electronic switch is lower than that of the writing current, the time delay necessary for amplification to obtain control power from the memory register output, as indicated in FIGS. 4 and 6, is almost zero and can be reduced to a negligible value in comparison with the time delay occurring in a conventional digit driver.

The timings of the various pulses in the cases illustrated in FIGS. 2(A) and 2(B) are shown in FIGS. 4 and 6, respectively. The pulse pattern corresponding to the case illustrated in FIG. 2(C) can be readily inferred from FIGS. 2(A) and 2(B) and, therefore, is herein omitted.

It is an important feature of the present invention that, if the instant at which the memory register is set by an information to be written is known, the writing instruction pulse is sent in advance of said instant by a time period equal to the time delay T due to amplification, and, by amplifying beforehand this writing instruction pulse to the necessary current value, a writing current having a polarity and waveform corresponding to the writing information is obtained with a time delay which is much smaller than T from said instant at which the memory register is set.

This feature is highly advantageous particularly in a memory device of the destructive read-out type wherein rewriting is required simultaneously with reading. More specifically, a writing instruction pulse is sent prior to the setting of the memory register by a reading signal, and when the reading signal enters the memory register, a writing current for rewriting can be caused to flow with a small time delay.

Thus, the above described feature of the present invention makes possible high-speed operations of magnetic memory devices.

A high-speed switching means for switching high current is necessary in the digit driver according to the invention and is provided by circuit arrangements and compositions as described hereinbelow with respect to actual examples of embodiment of the invention in conjunction with FIGS. 7 through 10, inclusive.

Figure 7:
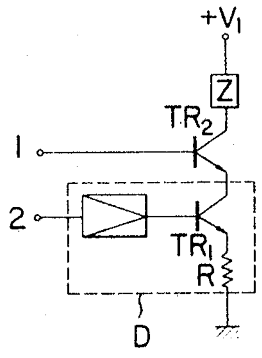

Referring first to FIG. 7, there is shown therein a basic form of the above mentioned high-speed switch, which comprises a current driver D including a transistor $TR_1$, a load Z (representing a digit line), and a transistor $TR_2$ inserted in series between the current driver D and the load Z, and which becomes a high-current switch when the base of the transistor $TR_2$ is controlled by the output of the memory register.

Figure 8:
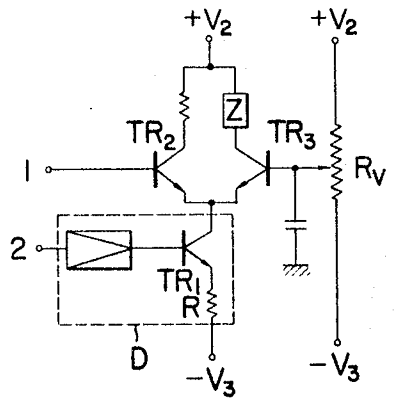

While in the case illustrated in FIG. 7, considerably high power is required to control the base of the transistor $TR_2$, the switch control power can be substantially lowered by using a circuit arrangement and composition similar to the current-switching type as shown in FIG. 8. That is, the time delay for amplification of the control power becomes very small.

The circuit arrangement examples shown in FIGS. 7 and 8 represent the case corresponding to FIG. 2(A) wherein a single-polarity $I_D$ is obtained, and the component within the dotted-line enclosure in each example corresponds to the pulse driver D shown in FIG. 2(A). The resistance R within the dotted-line enclosure is for affording current constancy.

In the case shown in FIG. 8, either one of the transistors $TR_2$ and $TR_3$ is always in the conductive state when a current is passed through the transistor $TR_1$, but the relative magnitudes of the base potentials of the transistors $TR_2$ and $TR_3$ determine which transistor is conductive. Accordingly, by fixing the base potential of the transistor $TR_3$ at the value midway between the potentials corresponding to digits "1" and "0" of the memory register, it is possible to determine the transistor, either $TR_2$ or $TR_3$, through which current will pass.

The example shown in FIG. 8 is so arranged that a writing current flows through the load Z when the transistor $TR_3$ is conductive, and no current flows through the load Z when the transistor $TR_2$ is conductive.

Power source voltages $V_1$, $V_2$, etc. are applied as indicated in FIGS. 7 through 10. The base potential of the transistor $TR_3$ is regulated by a variable resistance $R_V$.

Figure 9:
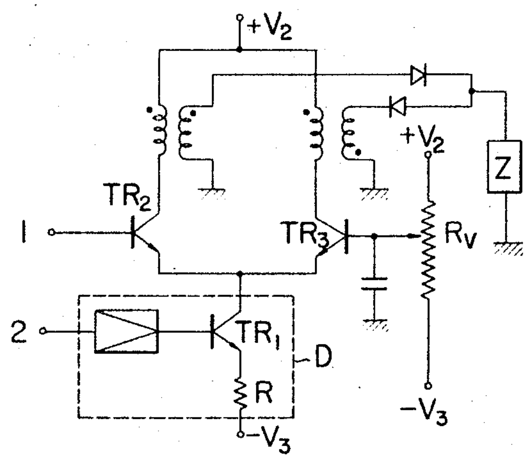

FIG. 9 shows a circuit arrangement for the case corresponding to FIG. 2(B) wherein an ambiopolarity $L_D$ is obtained. By this arrangement, output currents are combined by means of a transformer so that writing currents of mutually opposite polarity will flow through the load Z respectively when the transistor $TR_2$ is conductive and when the transistor $TR_3$ is conductive, this circuit also, the components within the dotted-line enclosure correspond to the pulse driver D in FIG. 2(B), and variable resistance $R_V$ has the same function as that in the example shown in FIG. 8.

Figure 10:
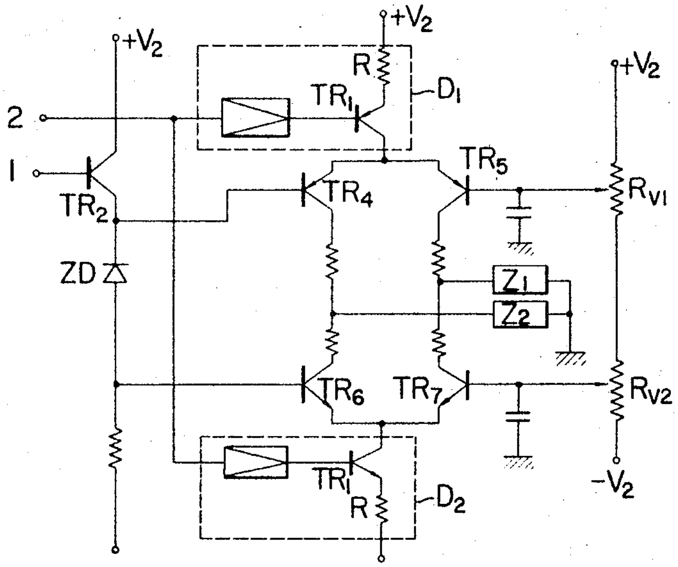

FIG. 10 shows a circuit arrangement for the case corresponding to FIG. 2(C) wherein an ambipolarity $I_D$ having two symmetrical outputs is obtained. This arrangement is based on the same principle as that of the example shown in FIG. 9, but is so adapted that, by the use of transistors $TR_4$ through $TR_7$, inclusive, of PNP and NPN units of complementary symmetry, symmetrical writing currents of positive and negative ambipolarity are caused to flow simultaneously through two loads $Z_1$ and $Z_2$ without the use of a transformer.

The circuit shown in FIG. 10 is further provided with a Zener diode ZD, pulse drivers $D_1$ and $D_2$ corresponding respectively to pulse drivers $D_1$ and $D_2$ in FIG. 2(C), and variable resistances $R_{V1}$ and $R_{V2}$ for regulating the base potentials of the transistors $TR_5$ and $TR_7$.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention as set forth in the appended claims.

What I claim is:

1. A digit driver system for a high speed magnetic memory device of the type comprising memory elements for storing information, a memory register, drivers for accomplishing reading and writing, and a sense amplifier for amplifying read-out signals; said digit driver system comprising at least one contactless electronic switch having a control terminal for receiving writing information from the memory register and at least one pulse driver for amplifying, beforehand, writing instruction pulses to an amplitude and waveform necessary for writing, the output side of the pulse driver being connected to the input side of the electronic switch thereby to obtain from the output side of the electronic switch a writing current with a polarity corresponding to said writing information entering the control terminal of the electronic switch.

2. A digit driver system for a high speed magnetic memory device of the type comprising memory elements for storing information, a memory register, drivers for accomplishing reading and writing, and a sense amplifier for amplifying read-out signals: said digit driver system comprising first and second contactless electronic switches each having a control terminal for receiving writing information from the memory register, said switches being connected in parallel in their control terminals and respective input and output sides; a pulse driver for amplifying, beforehand, writing instruction pulses to an amplitude and waveform necessary for writing, the output side of said pulse driver being connected to the input sides of said electronic switches; and a polarity inversion device connected between the output side of said second electronic switch and a common output terminal of said switches; thereby to obtain from the common output terminal of said electronic switches writing current pulses of mutually opposite polarity corresponding to the writing information entering into the control terminals of the electronic switches.

3. A digit driver system for a high speed magnetic memory device of the type comprising memory elements for storing information, a memory register, drivers for accomplishing reading and writing, and a sense amplifier for amplifying read-out signals: said digit driver system comprising first and second pulse drivers with a common input terminal, said pulse drivers acting to amplify, beforehand, writing instruction pulses to an amplitude and waveform necessary for writing; two pairs of contactless electronic switches each having a control terminal, all of the control terminals of said switches being connected to a common input for receiving a writing information from the memory register, the input sides of one pair of said electronic switches being connected to the output side of one of said pulse drivers and the input sides of another pair of said electronic switches being connected to the output side of another pulse driver, the output terminals of one of said one pair of the electronic switches and one of said other pair of the electronic switches being connected to a first common output terminal of the system, and the output terminals of the other remaining electronic switches being connected to a second common output terminal of the system.

References Cited

UNITED STATES PATENTS

| | | | |
|---|---|---|---|
| 2,967,951 | 1/1961 | Brown | 307—254 X |
| 3,106,646 | 10/1963 | Carter | 307—254 X |
| 3,205,481 | 9/1965 | Corbella et al. | 307—254 X |

DONALD D. FORRER, Primary Examiner

U.S. Cl. X.R.

307—238, 254, 270